Figure 1:
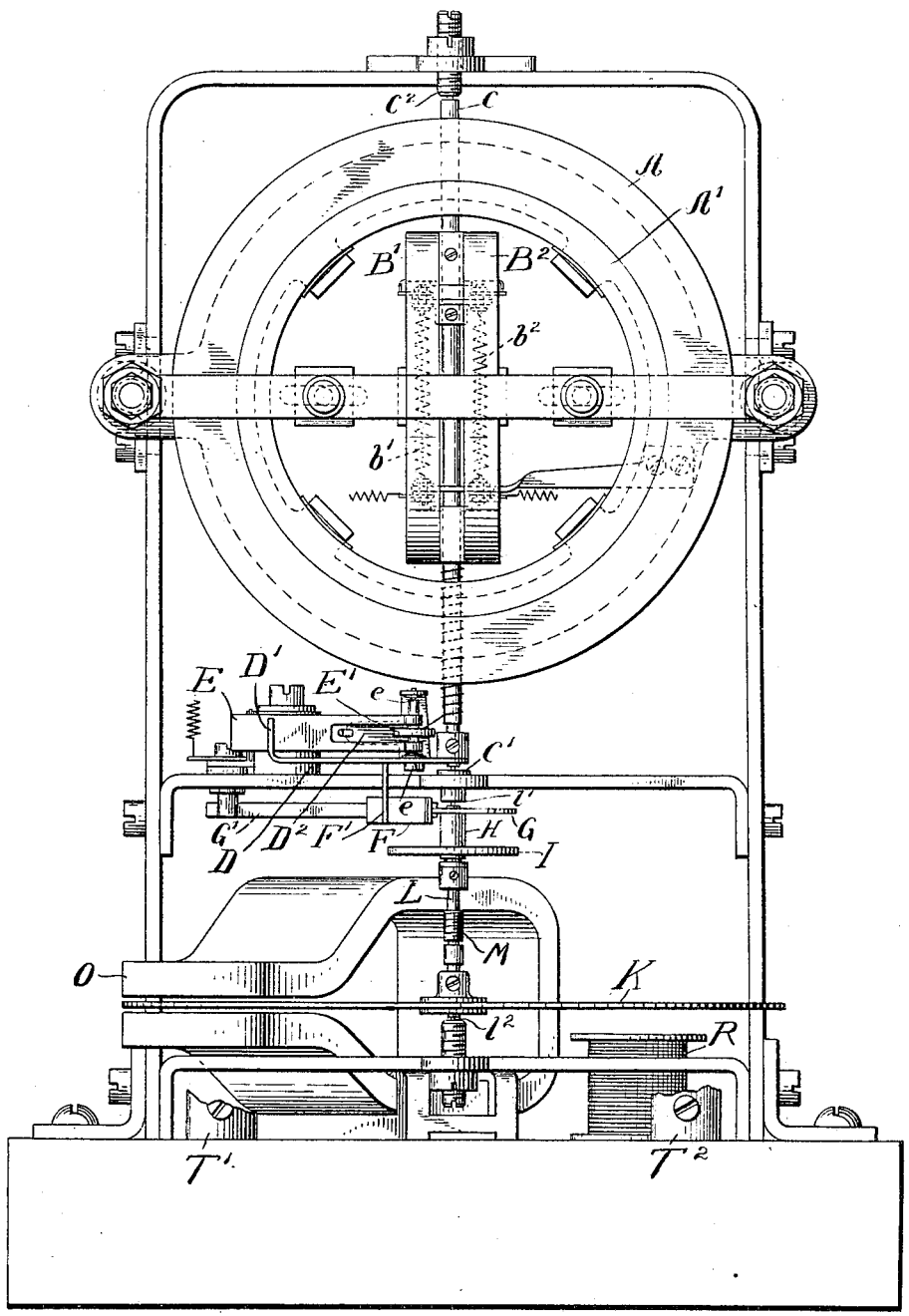

No. 784,387. PATENTED MAR. 7, 1905.
F. DARLINGTON.
ELECTRIC METER.
APPLICATION FILED OCT. 13, 1904.

4 SHEETS—SHEET 3.

Witnesses
Chas. A. Peard
L. Vreeland

Inventor
Frederick Darlington
By his Attorneys
Bartlett, Brownell & Mitchell

No. 784,387. Patented March 7, 1905.

UNITED STATES PATENT OFFICE.

FREDERICK DARLINGTON, OF GREAT BARRINGTON, MASSACHUSETTS.

ELECTRIC METER.

SPECIFICATION forming part of Letters Patent No. 784,387, dated March 7, 1905.

Application filed October 13, 1904. Serial No. 228,259.

*To all whom it may concern:*

Be it known that I, FREDERICK DARLINGTON, a citizen of the United States, residing at Great Barrington, in the county of Berkshire, State of Massachusetts, have invented certain new and useful Improvements in Electric Meters, of which the following is a full, clear, and exact description.

My invention relates to electric meters, and has for its object to produce an integrating-meter more especially adapted to measure direct currents, in which substantially all friction except that due to bearings or supports of the shaft shall be eliminated.

Heretofore meters for measuring direct currents have been employed which were provided with an armature having a commutator upon which bear commutator-brushes which produce friction during the time that the meter is integrating to such an extent as to materially interfere with the accuracy of the meter. This friction in such meters, which cannot be avoided, constitutes the greater part of the unavoidable friction in that class of meters, since the friction of the bearings by various devices known to the art can now be practically eliminated. In my meter the driving force, which may be the energy of a set of dynamometer-coils, is conveyed directly to the retarding force, which may be a magnetic brake, without the introduction of any element of friction or retardation tending to destroy the accuracy of the meter other than that due to the bearings or supports of the shaft, which, as before stated, can be practically eliminated. There is no brush or contact friction operating against the torque to be measured and integrated, and all energy necessary to make the single electrical contact which is part of the operation of the meter is supplied by a source of energy other than the source which produces the torque to be integrated. Moreover, the contact is made with sufficient force, pressure, and rub to prevent the possibilities of the contact-surface oxidizing and failing to close the circuit. Moreover, the construction is such that in the operation of the meter the rate of registration is not appreciably affected by variations within wide limits of the resistance of the contact, so that slight changes in the condition of the contact-surface will not change the rate of registration. Furthermore, in the form of meter hereinafter described, where a detent is used to engage a toothed wheel, the necessary force to drag a tooth under the detent is furnished by an extra source of energy other than the energy to be measured, and therefore such drag on the detent causes no interference or stoppage of the operation of the meter even on very light loads. A further advantage is that one of the elements of the meter having considerable weight and in a way corresponding to the armature of the ordinary direct-current meter—namely, the movable current-carrying coils—is operated in an oscillatory and not a continuously rotating manner and may therefore, if desired, be suspended in the well-known manner by a very light wire, permitting free oscillation and yet of sufficient strength to support the oscillating part. By this means much of the weight and friction of the oscillating parts can be taken off the jewel-bearings.

My invention is capable of being embodied both in meters for measuring the energy and in meters for measuring the current, suitable modifications, such as are well understood by those skilled in the art, being made to adapt it for one purpose or the other.

The following is a description of a meter embodying my invention, reference being had to the accompanying drawings, in which—

Figure 2:
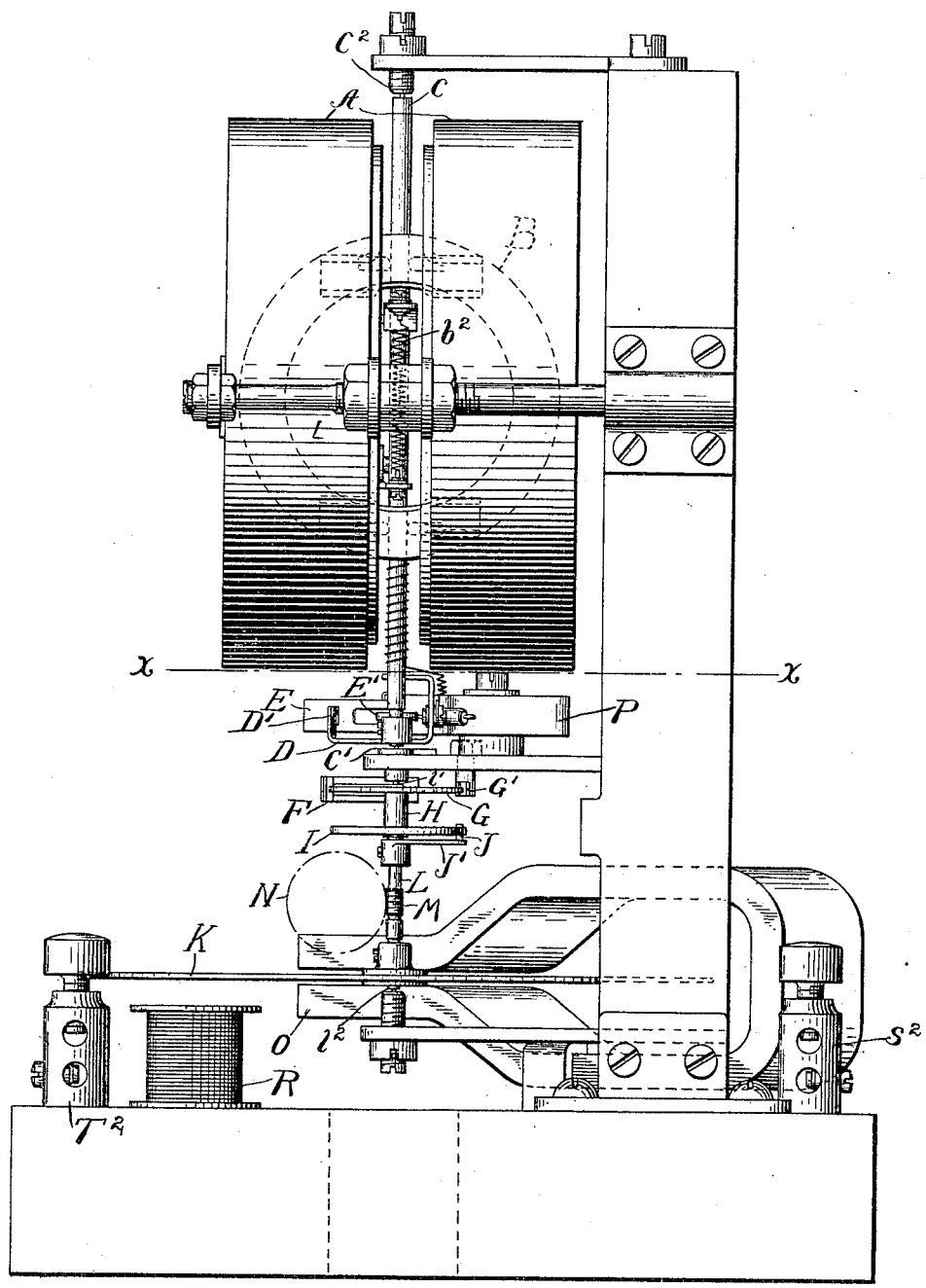
Figure 3:
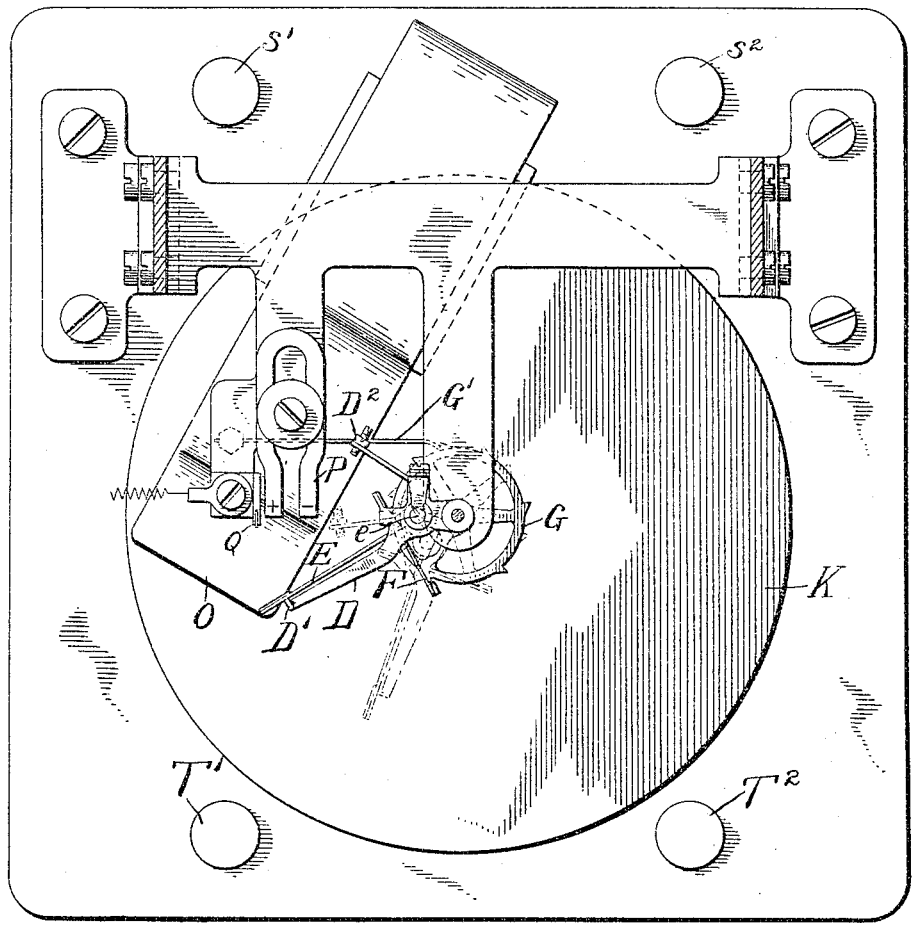
Figure 4:
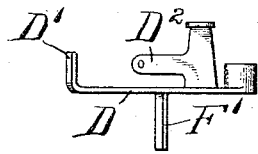
Figure 5:
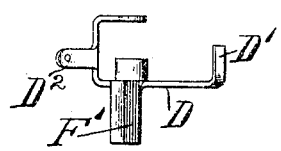
Figure 6:
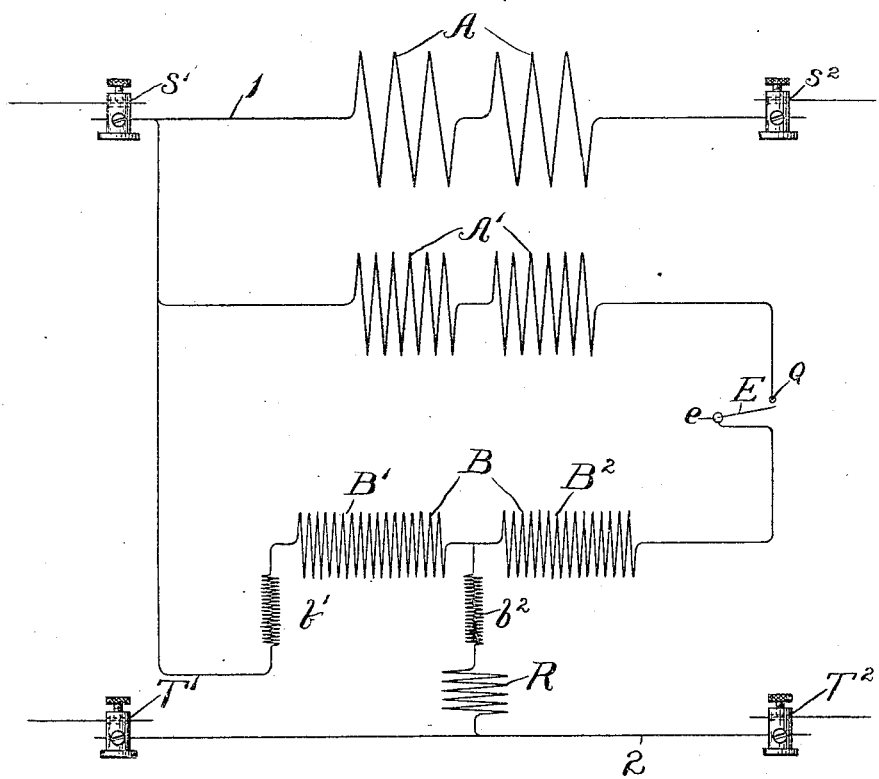

Figure 1 represents a front elevation of the operating parts of a meter. Fig. 2 is a side elevation of the same. Fig. 3 shows a sectional view on the line X X, Fig. 2. Figs. 4 and 5 are views of a detail. Fig. 6 is a diagram of circuits.

Referring more particularly to the drawings, which show an integrating-wattmeter embodying my invention, A represents the series coil of a dynamometer.

B represents the shunt-coil of a dynamometer. The shunt-coil B is mounted on a shaft C, journaled in bearings C' C². Upon the shaft C is mounted an arm D, of non-magnetic material, such as aluminium, which arm in turn carries an iron pallet E, pivoted in glass insulating-bearings $e$ and normally held by a spring E' against a stop D' on the arm D.

F is a spring ratchet-pawl carried by an arm F', projecting downwardly from the arm D, the outer end of which pawl engages the ratchet-wheel G. This ratchet-wheel is mounted on the upper end of a hollow shaft H, which at its lower end is connected by a spiral spring I to the stud J, which is rigidly connected by the arm J' to the shaft L, upon which the conducting-disk K is mounted. The shaft L is journaled at $l'\ l^2$. The shaft L is provided with a worm M, which communicates with an integrating-train N for registering the number of revolutions of the shaft L. The disk K rotates between the poles of a permanent braking-magnet constituting a drag whose movement is retarded according to the proper law.

The oscillating coil B is made up of two parts B' B², Fig. 6, wound in opposite directions. Of these parts one, B', is a coil of high resistance—for instance, two thousand ohms— and is connected through a flexible spiral $b'$ to the limb 1 of the circuit whose current is to be measured. The resistance of this coil or winding is preferably due to the large number of turns of fine wire employed on the body of the coil, although part of the resistance may be exterior thereto. The other or inner terminal of this part B' is connected to the other limb, 2, of the circuit through a flexible spiral $b^2$ in series with a high resistance R of, say, one thousand ohms. The other part of the coil B—namely, the winding B²—is of low resistance and has its inner end connected to the inner end of the part B' and is therefore also connected to the upper end of the spiral $b^2$ and has its outer end connected to the movable pallet E, mounted on the arm D, the connection being through the spring E'. This movable pallet E by the forward movement of the arm D is brought into the field of a permanent magnet P and attracted thereby, so as to be moved into contact with a terminal Q, which is electrically connected with the limb 1 of the circuit whose current is to be measured. The contacting surfaces of the pallet E and the terminal Q are made of platinum, so as to prevent oxidation, so far as possible.

In order to increase the efficiency of the apparatus, and particulary to insure its correct operation on very light loads, I connect the terminal Q with the limb 1 through a supplemental coil A', lying in the same plane with the main coil A and acting to supplement the field of that coil during the non-measuring or return period of the coil B.

In order to prevent the ratchet G from revolving backward, a detent G' is provided. The teeth upon the ratchet-wheel G drag under the detent G' while the pallet E is being strongly attracted by the magnet P, with the result that the magnet P supplies the energy necessary for overcoming the friction due to the contact of the ratchet-tooth upon the detent G'. The arm D carries a projection D², which on the return stroke of the arm D engages the pallet E, so as to drag it out of the field of the permanent magnet P, thus permitting the spring E' to throw it into engagement with the stop D'.

S' S² and T' T² are binding-posts for connecting the instrument to the circuit.

The operation of the instrument is as follows: When the lamps are turned on, so that a current passes through the main coil A, a torque is established which moves the coil B clockwise. As shown, the parts are in a position corresponding to a partial forward movement. The forward movement of the coil B carries the arm D forward from the position shown in dotted lines, Fig. 3, and with it the pallet E and pawl F and rotates the ratchet-wheel G, winding up the spring I and causing the disk K, with which it is connected, to rotate in the field of the permanent magnet O, the amount of motion being integrated by the train M. The arm D continues to move clockwise at a rate determined by the current in the coils A and B' until the magnetic pallet E enters the field of the permanent magnet P and is attracted thereby, so as to be moved into contact with the terminal Q. This contact short-circuits the high-resistance coil B' through the low-resistance coil B², which being wound in the reverse direction to the coil B' establishes a field of a polarity opposite to that of the field originally established by B' and causes the movable coil B to fly back, so that the pawl F engages another tooth upon the ratchet-wheel G, after which the stop D² upon the arm D hits the pallet E and breaks contact with the terminal Q, forcing the pallet E out of the field of the permanent magnet P, so that it may fly back under the impulse due to the spring E' until it rests against the stop D'. The breaking of the contact between the pallet E and the terminal Q reëstablishes the original conditions, deënergizing the coil B² and restoring the current in the coil B', so that the arm D, together with the pawl F and the ratchet-wheel G, is again moved in a clockwise direction. The coil A' being in series with the contact Q is traversed by the current which passes through the coil B², thus supplementing the magnetic field due to the coil A, so that on very light loads there is on the return stroke of the coil B always a sufficiently strong field to cause its prompt action and insure the breaking of the contact at the terminal Q and the full backward throw of the arm D and the pawl F.

It is to be observed that the contact of the pallet E with the terminal Q is a rubbing contact. This is due to the fact that the pivot $e$ is eccentric to the axis of the shaft C, so that the pallet E is rubbed over the surface of the terminal Q during any movement of the coil B which occurs during the time that the contact is maintained. The fact that the pallet E is normally behind a radial line passing through the shaft C and the pivot e results in a rubbing extending in both directions from the point at which contact is first made.

The detent G' is so located that it engages a tooth upon the ratchet-wheel G just at the time when the pallet E is strongly acted upon by the field of the magnet P and before the torsion of the spring E' has been overcome thereby. It results from this that the field of the permanent magnet acting upon the pallet E furnishes a source of power transmitted through the spring E' for dragging the tooth of the ratchet-wheel under the detent G', thus eliminating any error which might otherwise be caused by a drag due to the detent G' upon the ratchet-tooth.

The spring action between shaft H and the disk K establishes a yielding connection between the ratchet G and the disk K and results in a forward movement of the disk K during the back stroke of the arm D, as well as during its forward stroke, maintaining the speed of rotation of the disk K practically constant. The presence of the spring connection between the coil G and the disk K also prevents injury which otherwise might occur if the meter were subjected to a short-circuit current. Such a short-circuit current would exert a very powerful blow upon the shaft C, which if there were no spring connection would be resisted by the inertia of the disk K and also by the action of the brake-magnet O thereon. With the spring connection the comparatively light parts lying between the shaft C and the spring I yield to any such sudden blow, and thereby prevent any injury arising therefrom. Although the spring connection is not necessarily employed in meters embodying some features of my invention, yet when it is absent the motion of the disk is more irregular and the liability to damage from short-circuiting is much greater.

I have shown the integrating-train as being operated by a worm upon the shaft L. It can, however, be located at other points and be operated by any revolving or oscillating part the movement of which corresponds to the oscillations of the coil B, since all that is necessary is to record either the number of oscillations or the number of revolutions corresponding thereto.

My invention may be embodied in various forms and admits of various modifications, such as will suggest themselves to those skilled in the art and, as before stated, in its broad features may be embodied in current-meters as well as in wattmeters without departing from the spirit thereof.

What I claim is—

1. In an electric meter, the combination of a dynamometer having a stationary coil and an oscillating coil, a drag for retarding the movement of said oscillating coil in one direction only, a ratchet-wheel, a spring connecting said drag and said ratchet-wheel, a pawl connected to said coil and engaging said ratchet-wheel to move it in one direction only, a detent for preventing its movement in the reverse direction, and means for integrating an amount proportional to the number of swings of said coil.

2. In an electric meter, the combination of a dynamometer having a stationary and an oscillating coil, a drag for retarding the movement of said oscillating coil in one direction only and means for establishing a mechanical spring connection between said drag and said oscillating coil during its movement in said direction only, means for electrically moving said coil in the reverse direction, and means for integrating said movement of said coil.

3. In an electric meter, the combination of a dynamometer having a stationary and a movable coil, said movable coil having windings in a forward direction, and windings in a reverse direction, means for causing a current to flow alternately through said windings, producing movements of said coil in both directions, and means for connecting said coil to a drag during the movement of said coil in one direction only.

4. In an electric meter, the combination of a dynamometer having a stationary and a movable coil, said movable coil having windings in a forward direction, and windings in a reverse direction, means for causing a current to flow alternately through said windings, a drag, and means for establishing a spring connection between said movable coil and said drag during the movement of said coil in one direction only.

5. In a meter, the combination of contact members, an electromagnetic device having a circuit controlled thereby and acting to bring said members into proximity to one another and to subsequently separate them and an auxiliary magnet acting to cause said members when brought into proximity to one another by said electromagnetic device to engage and also to delay the separation of said members.

6. In an electric meter, the combination of a dynamometer having a stationary coil and an oscillating coil, and a circuit-changer for controlling the current through said movable coil, said circuit-changer consisting of a pallet carried by said movable coil and movably connected thereto and a contact and a magnet for causing said pallet to engage said contact, said pallet and contact being connected, one to windings of said coil and the other to one of the mains.

7. In a meter, the combination of a dynamometer having a stationary and a movable coil, said movable coil having a forward and a reverse winding, means for alternately passing a current through said windings and a coil in series with one of said windings when the current is passed through the same and acting to reinforce the field of said stationary coil.

8. In an electric meter, the combination of a dynamometer having a stationary and a movable coil, said moving coil having two windings in opposite directions, means for alternately passing current through said windings, and a coil acting to reinforce the field of said stationary coil connected in circuit when the current is passed through one of said windings.

9. In an electric meter, the combination of a dynamometer having a stationary and a movable coil, a current-changer for said movable coil consisting of a pallet pivoted eccentrically to the axis of said movable coil, a contact engaged thereby, and means for holding it temporarily in engagement with said contact during a partial movement of said coil.

10. In an electric meter, the combination of a dynamometer having a stationary and a movable coil, a current-changer for said movable coil consisting of a pallet movably connected to said movable coil, a contact engaged thereby, and means for holding it temporarily in engagement with said contact during a partial movement of said coil.

11. In an electric meter, the combination of a dynamometer having a stationary and a movable coil, a current-changer for said movable coil consisting of a magnetic pallet pivoted eccentrically to the axis of said coil, a contact, a magnet for attracting said pallet and retaining it temporarily in engagement with said contact and means for withdrawing it from said contact.

12. In an electric meter, the combination of a dynamometer having a stationary and a movable coil, a current-changer for said movable coil consisting of a magnetic pallet movably connected to said coil, a contact, a magnet for attracting said pallet and retaining it temporarily in engagement with said contact and means for withdrawing it from said contact.

13. In an electric meter, the combination of a ratchet-wheel, a detent therefor, a pawl for said wheel, a magnetic member mechanically connected to said pawl and a magnet acting on said magnetic member to overcome the friction of said detent upon said ratchet-wheel.

14. In an electric meter, the combination of a ratchet-wheel, a detent therefor, a pawl for said wheel, a magnetic member mechanically connected to said pawl, a magnet acting on said magnetic member to overcome the friction of said pawl upon said ratchet-wheel, and means for thereafter overcoming the attraction of said magnet for said magnetic member.

15. In a meter, the combination of a dynamometer having a stationary and a movable coil, said movable coil having windings in opposite directions whose inner ends are connected with one another, and whose outer ends are connected to the same limb of the circuit, the resistance of one winding being high and the resistance of the other winding being relatively low, an electrical connection between the other limb of the circuit and the inner ends of said windings, and means for disconnecting and reconnecting the outer end of said low-resistance winding from said first-mentioned limb.

16. In a meter, the combination of a dynamometer having a stationary and a movable coil, said movable coil having windings in opposite directions whose inner ends are connected with one another, and whose outer ends are connected to the same limb of the circuit, the resistance of the circuit of one winding being high and the resistance of the other winding being relatively low, an electrical connection between the other limb of the circuit and the inner ends of said windings, means for disconnecting and reconnecting the outer end of said low-resistance winding from said first-mentioned limb and an auxiliary coil in series with said low-resistance winding acting to reinforce the field of said stationary coil when said low-resistance coil is connected to said first-mentioned limb.

Signed at Great Barrington, Massachusetts, this 11th day of October, 1904.

FREDERICK DARLINGTON.

Witnesses:
H. M. SMITH,
L. F. PARKHURST.